(12) United States Patent
Ronan et al.

(10) Patent No.: US 10,993,074 B2
(45) Date of Patent: Apr. 27, 2021

(54) POWER MANAGEMENT AND DATA BANDWIDTH IMPROVEMENTS FOR PASSIVE ENTRY, PASSIVE START (PEPS)

(71) Applicant: Cypress Semiconductor Corporation, San Jose, CA (US)

(72) Inventors: Tessa Ronan, San Francisco, CA (US); Victor Simileysky, San Jose, CA (US); Walter James Wihardja, Tustin, CA (US); Kiran Uln, Pleasanton, CA (US)

(73) Assignee: Cypress Semiconductor Corporation, San Jose, CA (US)

( * ) Notice: Subject to any disclaimer, the term of this patent is extended or adjusted under 35 U.S.C. 154(b) by 0 days.

(21) Appl. No.: 16/457,047

(22) Filed: Jun. 28, 2019

(65) Prior Publication Data

US 2020/0236494 A1 Jul. 23, 2020

Related U.S. Application Data

(60) Provisional application No. 62/804,907, filed on Feb. 13, 2019, provisional application No. 62/794,908, filed on Jan. 21, 2019.

(51) Int. Cl.
*H04W 4/23* (2018.01)
*H04W 4/02* (2018.01)
(Continued)

(52) U.S. Cl.
CPC .......... *H04W 4/023* (2013.01); *B60R 25/209* (2013.01); *B60R 25/24* (2013.01); *H04L 12/40* (2013.01); *H04L 69/324* (2013.01); *H04W 4/80* (2018.02); *H04W 56/001* (2013.01); *H04W 76/10* (2018.02); *B60R 2325/205* (2013.01); *H04L 2012/40215* (2013.01); *H04L 2012/40273* (2013.01)

(58) Field of Classification Search
CPC ....... H04W 4/023; H04W 48/04; H04W 4/80; H04W 56/001; H04W 76/10; H04L 12/40
See application file for complete search history.

(56) References Cited

U.S. PATENT DOCUMENTS 9,008,917 B2 4/2015 Gautama et al.
9,045,102 B2 6/2015 Caratto et al.
(Continued)

OTHER PUBLICATIONS

International Search Report for International application No. PCT/US2019/060992 dated Jan. 22, 2020, 2 pages.
(Continued)

*Primary Examiner* — Myron Wyche

(57) ABSTRACT

A passive entry, passive start (PEPS) application is described, wherein a number of sensors are configured with wireless communication protocol information for wireless communication between a master device and a BLE hub. The sensors eavesdrop signals from the master device to the BLE hub while not in operative communication with the master device. Eavesdropped signals are processed to determine and calculate position-related information, such as phase and magnitude of the wireless signals received at multiple antennas of the sensors, angle-of-arrival (AoA), and distance or position of the master device relative to the sensors, individually or as a system. Power management techniques for a PEPS system are also described.

24 Claims, 7 Drawing Sheets

(51) Int. Cl.
    *H04L 12/40*     (2006.01)
    *H04W 4/80*     (2018.01)
    *H04L 29/08*     (2006.01)
    *H04W 56/00*     (2009.01)
    *B60R 25/24*     (2013.01)
    *B60R 25/20*     (2013.01)
    *H04W 76/10*     (2018.01)

(56) References Cited

U.S. PATENT DOCUMENTS

| | | | |
|---|---|---|---|
| 9,424,451 | B2 | 8/2016 | Kalhous et al. |
| 9,554,286 | B2 | 1/2017 | Ghabra et al. |
| 10,091,633 | B2 | 10/2018 | Ghabra et al. |
| 10,149,133 | B2 | 12/2018 | Scagnol et al. |
| 10,179,567 | B2 | 1/2019 | Nantz et al. |
| 10,207,677 | B1 | 2/2019 | Lazarini et al. |
| 10,249,123 | B2 | 4/2019 | Hatton |
| 10,511,939 | B1 * | 12/2019 | Wihardja ............... H04W 4/029 |
| 2018/0103414 | A1 * | 4/2018 | Golsch .................. B60W 10/08 |
| 2018/0267131 | A1 * | 9/2018 | Simileysky ........... H04W 4/023 |
| 2019/0070958 | A1 | 3/2019 | Fogelklou |
| 2019/0086526 | A1 | 3/2019 | Golsch |
| 2019/0116556 | A1 | 4/2019 | Golsch et al. |

OTHER PUBLICATIONS

Written Opinion of the International Searching Authority for International application No. PCT/US2019/060992 dated Jan. 22, 2020, 10 pages.

"Perfectly Keyless," Bosch Mobility Solutions, Dec. 2018, pp. 1-11; 11 pages.

* cited by examiner

POWER MANAGEMENT AND DATA BANDWIDTH IMPROVEMENTS FOR PASSIVE ENTRY, PASSIVE START (PEPS)

PRIORITY

This application claims the priority and benefit of U.S. Provisional Application No. 62/794,908 filed on Jan. 21, 2019 and U.S. Provisional Application No. 62/804,907 filed on Feb. 13, 2019, both of which are incorporated by reference herein.

TECHNICAL FIELD

This disclosure relates to the field of passive entry and passive start using wireless communication between a master device, a slave device, and a number of connected sensors.

BACKGROUND

Passive entry, passive start (PEPS) applications allow users to interface with a device, such as a vehicle faster and more intuitively. However, the system and environment of a PEPS-enabled device, such as a vehicle, may create issues with connectivity with a device detected by the car. It is therefore desired to have a system with multiple sensors capable of detecting a user and to calculate position or position-related information for the user by those multiple sensors. Furthermore, as a system employing a number of sensors becomes more complex, power-saving techniques may be necessary to preserve battery life and ensure operability of the entire system.

DETAILED DESCRIPTION

The following description sets forth numerous specific details such as examples of specific systems, components, methods, and so forth, in order to provide a good understanding of various embodiments of the communication schemes and techniques. It will be apparent to one skilled in the art, however, that at least some embodiments may be practiced without these specific details. In other instances, well-known components or methods are not described in detail or are presented in a simple block diagram format in order to avoid unnecessarily obscuring the techniques described herein. Thus, the specific details set forth hereinafter are merely exemplary. Particular implementations may vary from these exemplary details and still be contemplated to be within the spirit and scope of the present invention.

References in the description to "an embodiment", "one embodiment", "an example embodiment", "some embodiments", and "various embodiments" mean that the particular feature, structure, or characteristic being referred to is included in at least one embodiment of the invention. Further, the appearances of the phrases "an embodiment", "one embodiment", "an example embodiment", "some embodiments", and "various embodiments" in various places in the description do not necessarily all refer to the same embodiment(s).

In various embodiments, the communication schemes and techniques described herein may comprise one or more methods that are executed by one or more devices and/or controllers thereof. Although the operations of such method(s) are shown and described hereinafter in a particular order, the operations of each method may be altered so that certain operations may be performed in a different order or so that certain operation(s) may be performed, at least in part, concurrently and/or in parallel with other operations. In other embodiments, instructions or sub-operations of distinct operations may be executed in an intermittent and/or alternating manner. Thus, the various method embodiments of the described techniques, as well as the order of operations therein, are to be regarded in an illustrative rather than a restrictive sense.

Figure 1:
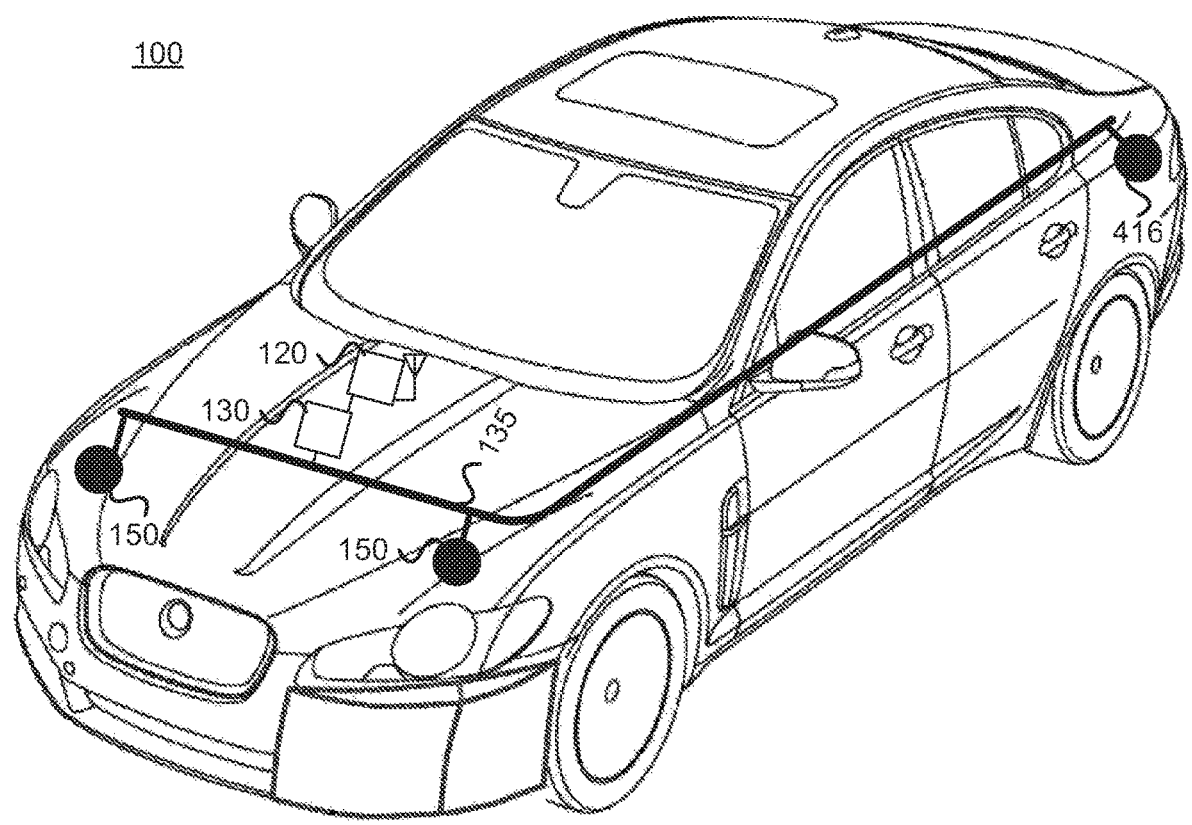
FIG. 1 illustrates an automotive system including sensors for receipt of wireless information from a master device for passive entry, passive start, according to one embodiment.

FIG. 1 illustrates an automotive system 100 including sensors 150 that may be used for position calculation or position-related information in a passive entry, passive start (PEPS) application. A PEPS application may allow a user to access (gain entry) to a vehicle and start that vehicle based on the position of the user (or a device the user is holding or using). As a device, such as a mobile phone or a key fob, gets closer to a vehicle applications on the vehicle may start. User settings for operation of the vehicle may be configured. The doors may unlock. Air conditioning or heat may be turned on. Still other settings or applications may be started or "pre-loaded" for the user based on their position relative to the vehicle. Once the user gains access to the vehicle and the device used for PEPS is inside, the location of the device inside the vehicle may allow the user to start the car without actually using the device. Sensors disposed within the vehicle may determine that the device is in the correct location and the car may be started. In another embodiment, the location of the device in the car may prevent the car from locking until the car is moving. This may prevent users from locking their keys in the car.

Sensors 150 may receive wireless data from a master device (not shown) in operative communication with a slave device 120. Sensors 150 may include multiple antennas in an array, each antenna for receiving wireless information. The phase and magnitude of the wireless signal at each antenna of sensors 150 may be used to determine angle of arrival of signals to the sensor, distance of a transmitter from the sensors, or position of the transmitter relative to the sensor. Slave device 120 and the master device may establish a connection, but sensors 150 may eavesdrop the wireless data packets and use appropriately constituted packets for calculating position-related information such as phase and amplitude of the wireless signal, angle of arrival (AoA), distance of the transmitter (master device) from sensors 150, or position of the transmitter relative to the sensors or the system 100 comprising the sensors. The master device may only be in operative communication with the slave device, but eavesdropping by the sensors may occur once timing and protocol information of the communication parameters is shared by slave device 120 to sensors 150. Communication parameters may be shared with sensors 150 over a bus, such as CAN bus 135 by an MCU 130 that is coupled to the bus. MCU 130 may be used for sending connection parameters to sensors 150, but it may also be used for receiving processed wireless data packets for determination of various characteristics of the position of the master device relative to at least one of the sensors 150. Processed wireless packets may include the phase/magnitude of the wireless signals received at the antennas of each of the sensors 150, the AoA of the wireless signals, the distance of the master device from the sensors, or the position of the master device relative to sensors 150 or system 100.

In various embodiments, calculation of the angle of arrival, distance, or position may be completed by different system elements. In other embodiments, only angle of arrival may be calculated from the phase and magnitude of the wireless signals. Distance and position may not be calculated. In still other embodiments, sensors may be used to measure phase and magnitude of the wireless signals, determine the angle of arrival, calculated distance, and determine position. Sensors may only perform a subset of those actions, while another device, such as the MCU performs others. Not all actions must be performed by an element of the system.

Figure 2A:
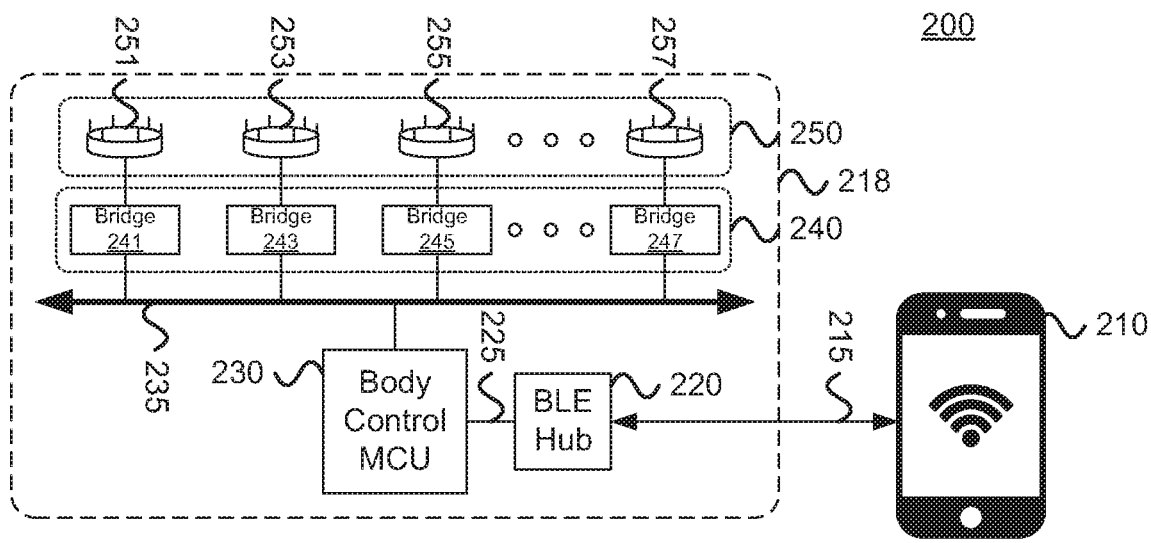
FIG. 2A illustrates a system for eavesdropping wireless signals by multiple sensors, the wireless signals from a master device to a slave device which is not one of the multiple sensors, according to one embodiment.

FIG. 2A illustrates an embodiment of a system 200 for eavesdropping wireless signals 215 from a master device 210 to a BLE hub (communication hub device) 220 by a number of sensors 250, which may be formed as part of subsystem 218. Sensors 250 may include sensors 251, 253, 255, and 257 with outputs each coupled to a bridge device 240, which may include bridges 241, 243, 245, and 247. Sensors 250 may include multiple antennas in an array, each antenna for receiving wireless information. The phase and magnitude of the wireless signal at each antenna of sensors 250 may be used to determine angle of arrival of signals to the sensor, distance of a transmitter from the sensors, or position of the transmitter relative to the sensor. Sensors 250 may be in operative communication with bridges 240 via a universal asynchronous receiver/transmitter (UART) or serial peripheral interface (SPI) connection. In other embodiments other communication protocols may be used by bridges 240 to communicate with sensors 250. Bridges 240 may receive information from sensors 250 via UART communication and retransmit that information to a body control MCU 230 over a controller area network (CAN) bus 235. CAN bus 235 may also be used to transmit timing and protocol information for wireless communication between BLE hub 220 and master device 210 to sensors 250. Timing and protocol information provided to sensors 250 may allow sensors 250 to eavesdrop the wireless signals 215 and provide information indicative of position of wireless device 210 to at least one of sensors 250. This information may be processed by body control MCU 230 to calculate absolute or relative position of the master device to subsystem 218. As stated above, various forms of position-related data may be calculated and determined by various elements of system 200.

Figure 2B:
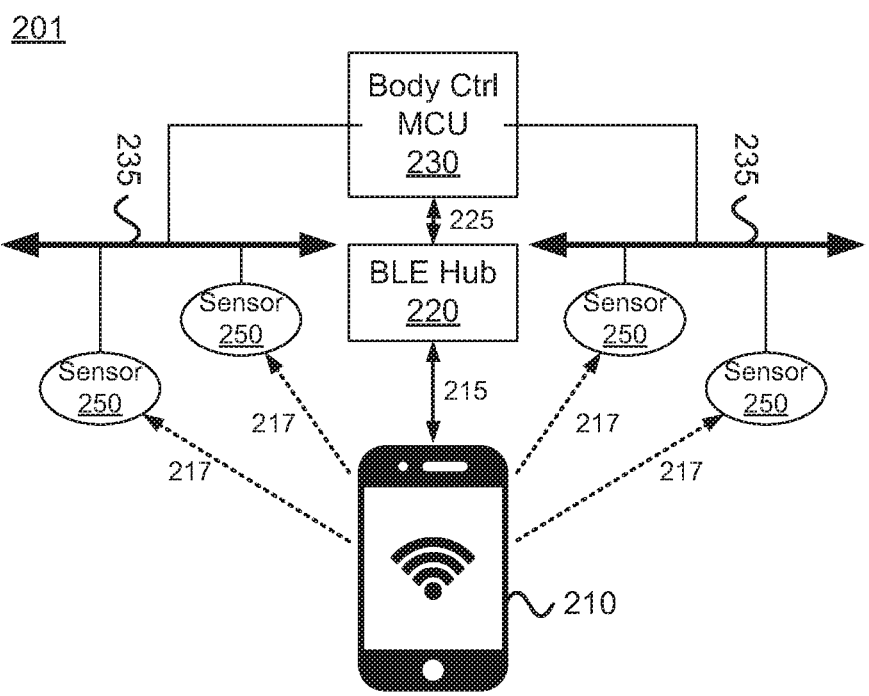
FIG. 2B illustrates a system for eavesdropping wireless signals by multiple sensors, the wireless signals from a master device to a slave device which is not one of the multiple sensors, according to one embodiment.

FIG. 2B illustrates an embodiment of a system 201 wherein sensors 250 eavesdrop signals 215 from master device 210 to BLE hub 220. Once operative communication is established between master device 210 and BLE hub 220, and once timing and protocol information has been distributed to sensors 250 from BLE hub 220, sensors 250 may synchronize with the wireless communication and receive an eavesdropped signal 217 corresponding to wireless signal 215 between master device 210 and BLE Hub 220. Eavesdropped signal 217 and wireless signal 215 may be the same, the difference being by which device they are received and what processing is done by that device. Master device 210 may not be in operative communication with sensors 250. However, the wireless information passed to BLE hub 220 by wireless signal 215 may be received by sensors 250 as wireless signal 217 and sent to MCU 230 for processing and calculation of position- and/or movement-related data of the master device 210.

In both the embodiments shown in FIGS. 1, 2A, and 2B, four sensors are illustrated. This embodiment is intended to be illustrative and not limiting. In various embodiments, more or fewer than four sensors may be used. For the purposes of illustration, four sensors are demonstrated as corresponding to the four corners of an automobile equipped with a PEPS system for access and control. But the presence of more than or fewer than four sensors and sensors disposed as locations not corresponding to the four corners of an automobile is understood. Furthermore, the embodiments shown illustrate sensors disposed on the exterior of a vehicle, however additional sensors may be placed in such a way that they may be able to calculate position-related information of the master device inside the car.

The embodiments and descriptions described herein reference angle-of-arrival (AoA). However, angle-of-departure (AoD) may also be used if the transmitter (master device) is implemented with multiple antennas, each broadcasting a signal received by a single antenna of each sensor. This is in contrast to an AoA-implementation, where a signal transmit antenna of the master device transmits a signal received on multiple antennas of each sensor. In some applications, it may be advantageous for the master device to have the larger form-factor than the sensors. In these applications, AoD may be preferred.

Also in the embodiments shown in FIGS. 2A and 2B, master device 210 is illustrated as a smart phone. However, the signals that are sent to BLE hub may be sent by any device having BLE functionality, including keys, key fobs, tablets, or other mobile devices that may be used to control or allow access to a system equipped with wireless sensors.

Figure 3A:
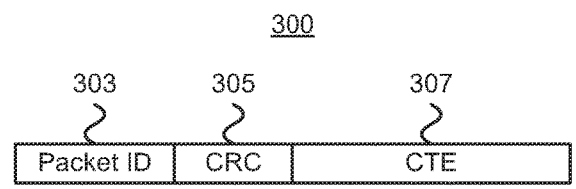
FIG. 3A illustrates a packet used in position calculation by an AoA device in a wireless system, according to one embodiment.

FIG. 3A illustrates an exemplary continuous tone extension (CTE) packet 300 that may be transmitted from master device 210 and received by BLE hub 220 and sensors 250. CTE packet may include a first portion (bytes) that includes a packet ID 303. Packet ID 303 may be used by BLE hub 220 and sensors 250 to ensure that the correct packets are processed for position calculation. If packet IDs from different sensors do not match or the packet ID received by sensors 250 does not match the expected packet ID, packet data included in the packet ID may be ignored to ensure that position calculation is not corrupted with the wrong information. CTE packet 300 may also include a cyclic redundancy check (CRC) section 305. CRC section 305 may include firmware-produced CRC data that is used to ensure that the packet is not corrupted or "bad." If the CRC indicates that the packet is bad, the packet may be ignored or a replacement (retransmitted) packet may be requested. A failed CRC may also indicate that the packet is not a CTE packet (e.g., a control packet) and is not intended for use in calculation or position-related information by sensors 250 or MCU 230. CTE packet 300 may also include a CTE section 307 as its payload. CTE section 307 may comprise a series of de-whitened 0's or 1's that are used by the sensor to extract the phase/amplitude information use for angle, distance and position calculation. The CRC portion of the packet may also be produced by hardware, by programmable logic, or by any means for producing values derived from some level of processing.

Figure 3B:
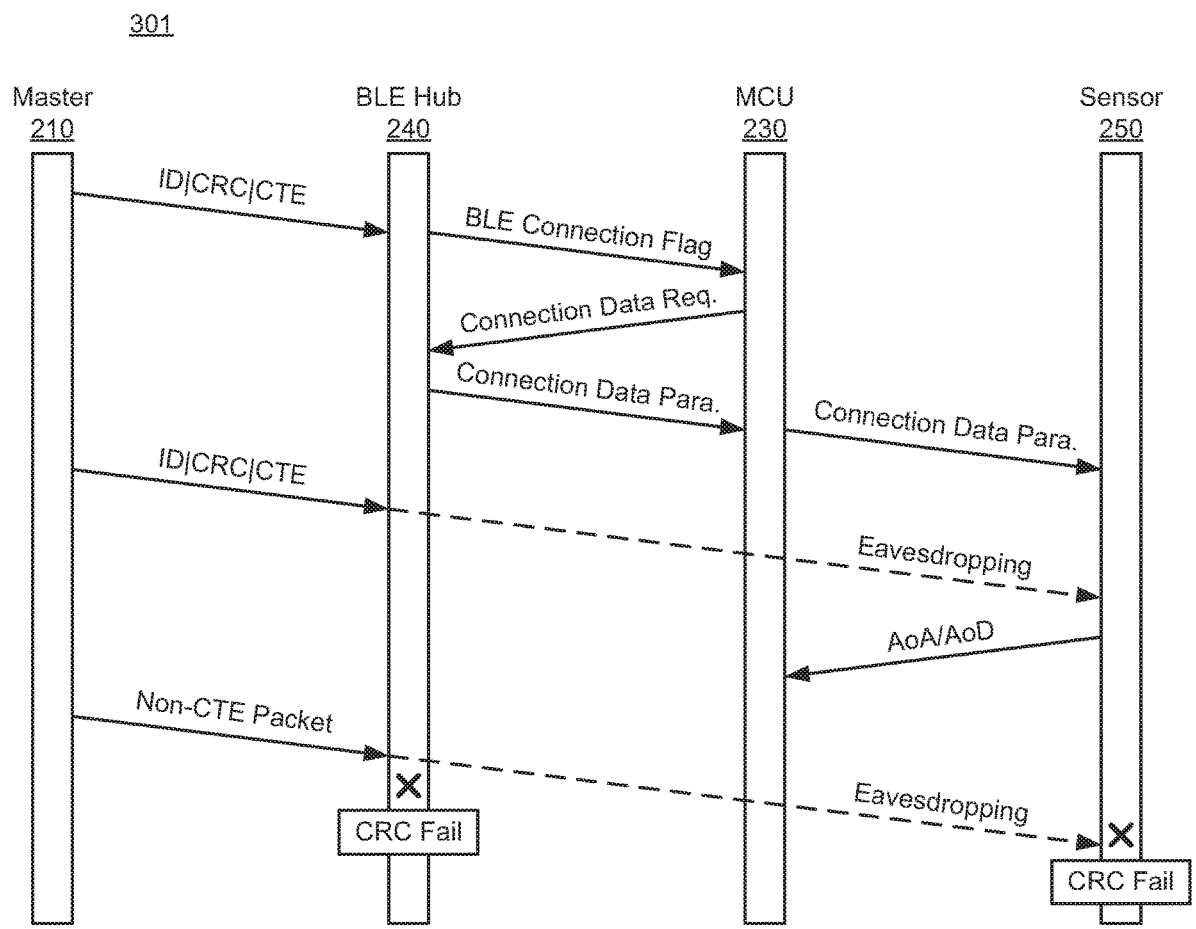
FIG. 3B illustrates a communication handshake between various components of a system for wireless communication for eavesdropping of wireless signals from a master to a slave device by at least one sensor, according to one embodiment.

FIG. 3B illustrates communication between various components of a system for wireless communication and angle, distance and position calculation, including a master (such as wireless device 210), a BLE hub (such as BLE hub 220), an MCU (such as MCU 230), and at least one sensor (such as sensors 250). Master 210 may communicate a packet, such as packet 300, to BLE hub 220. Packet 300 may include the packet ID, a CRC region, and a CTE region for use in position determination by MCU 230. Once a connection between master 210 and BLE hub 220 is established, BLE hub 220 may send a BLE connection flag to MCU 230. The BLE connection flag may be communicated directly to the MCU through a connection between the BLE hub and the MCU. In another embodiment, the connection between the BLE hub and the MCU may be through an additional, intermediary device (not shown). The MCU 230 may then request the connection data from the BLE hub 220. Connection data may include timing information for receipt of wireless signals from the master 220 by the BLE hub when connection is made. The BLE hub 220 may return the connection data to the MCU, which may then communicate the connection information to sensors 250 over a bus, such as a CAN bus.

Once sensors 250 have the connection data, they may synchronize with the wireless communication between master device 210 and BLE hub 220. Sensors 250 may then be configured to receive packets from master 210 simultaneous with the BLE hub by eavesdropping. Information on phase and magnitude of the received signal can then be passed to MCU 230 over the bus to be used in angle of arrival calculation, distance calculation, or position determination. In various embodiments, and as described above, processing of phase and magnitude of the received signals may be completed in different devices. In one embodiment, only phase and magnitude of the received signals is sent by the sensors to the MCU over the bus. The MCU then calculates the angle of arrival to the various sensors that provided phase and magnitude. In other embodiments, the sensors may process the phase and magnitude to produce an angle value, which is provided to the MCU. In still other embodiments, the sensors may process the phase and magnitude information to provide distance and position and provide that data to the MCU over the bus. Furthermore, in certain embodiments, values provided to the MCU, be they phase/magnitude, angle of arrival, distance, or position, may be accompanied by a confidence metric.

Synchronization with wireless communication between the sensors and the master device may also be to the connection interval. The BLE hub may pass the connection interval to the sensors through the MCU so that the sensors "wake-up" and listen for the CTE packet from the master device when it is expected. The sensors may then go back to sleep after receiving the packet and sending data to the MCU. In this embodiment, the sensors are awake only when needed to receive the packet from the master device. The system wakes up together and goes back to sleep together, achieving significant power savings.

A confidence metric may be used to provide the MCU, or whatever calculates the position-related data, with information on how much weight to give data from a specific sensor. For instance, low interference and strong signal strength, coupled with an indication that the master device is close to the sensor may yield high confidence. Conversely, high interference, lo signal strength, and an indication that the master device is far away from the sensor may yield low confidence. If the sensor has missed several packets, or was required to resynchronize, this may be an indicator of low confidence. The MCU, or other calculating element of the system, may ignore sensors that provide data with low confidence, based on a threshold. Only the highest-confidence sensors may be used, in another embodiment. Or in other embodiments, weights may be applied to all sensors or sensors with a threshold confidence metric. Sensors may pass the confidence metric to the MCU for processing as a distilled version of all of the external impacts on the position-related data sent from the MCU. In another embodiment, sensors may send a confidence metric as well as information on the various external impacts including RSSI, signal-to noise ratio (SNR), signal-to-interference-plus-noise ratio (SINR) or signal-to-noise-plus-interference ratio (SNIR). In still other embodiments, only the information on external impacts may be passed to the MCU. It is not necessary for all of the above information to be sent. Rather, all, none, or a subset thereof may be passed to the MCU based on application requirements.

If a non-CTE packet (a packet that does not align with CTE packet 300 in FIG. 3A) is sent by the master and received by the BLE hub and the sensors 250, a CRC fail may occur. In this case, AoA-relevant information, such as phase/magnitude, angle or arrival, distance, or position information is not provided to the MCU.

The master device may be configured to send a constant tone extension (CTE) in its packet payload, as illustrated in FIGS. 3A and 3B. This configuration may be used to support legacy BLE devices, which may be used in position calculation. The CTE data may be a stream of de-whitened 0's or 1's. Also included in the packet is the packet ID. the packet ID may ensure that packets received and processed by multiple sensors are synchronized. Errors or ambiguity in the timing of the packets received by the various sensors may cause errors in the calculated and tracked position of the master device relative to the sensors. For example, if the timing information is not aligned, one sensor may produce difference position data for the MCU than other sensors, causing potentially significant errors in the calculated position of the master device by inclusion of incorrect position information caused by timing mismatches.

Packet IDs also allow sensors to detect retries by the master device. If a packet ID indicates that the packet is a retry, the CTE may not be processed. Its payload is the same as a previous packet, just transmitted on a different channel.

But since the packet of a retry packet is the same information transmitted on a different channel, the CTE is no longer valid and the sensor can therefore ignore the CTE data, reducing processing and power requirements.

Figure 4:
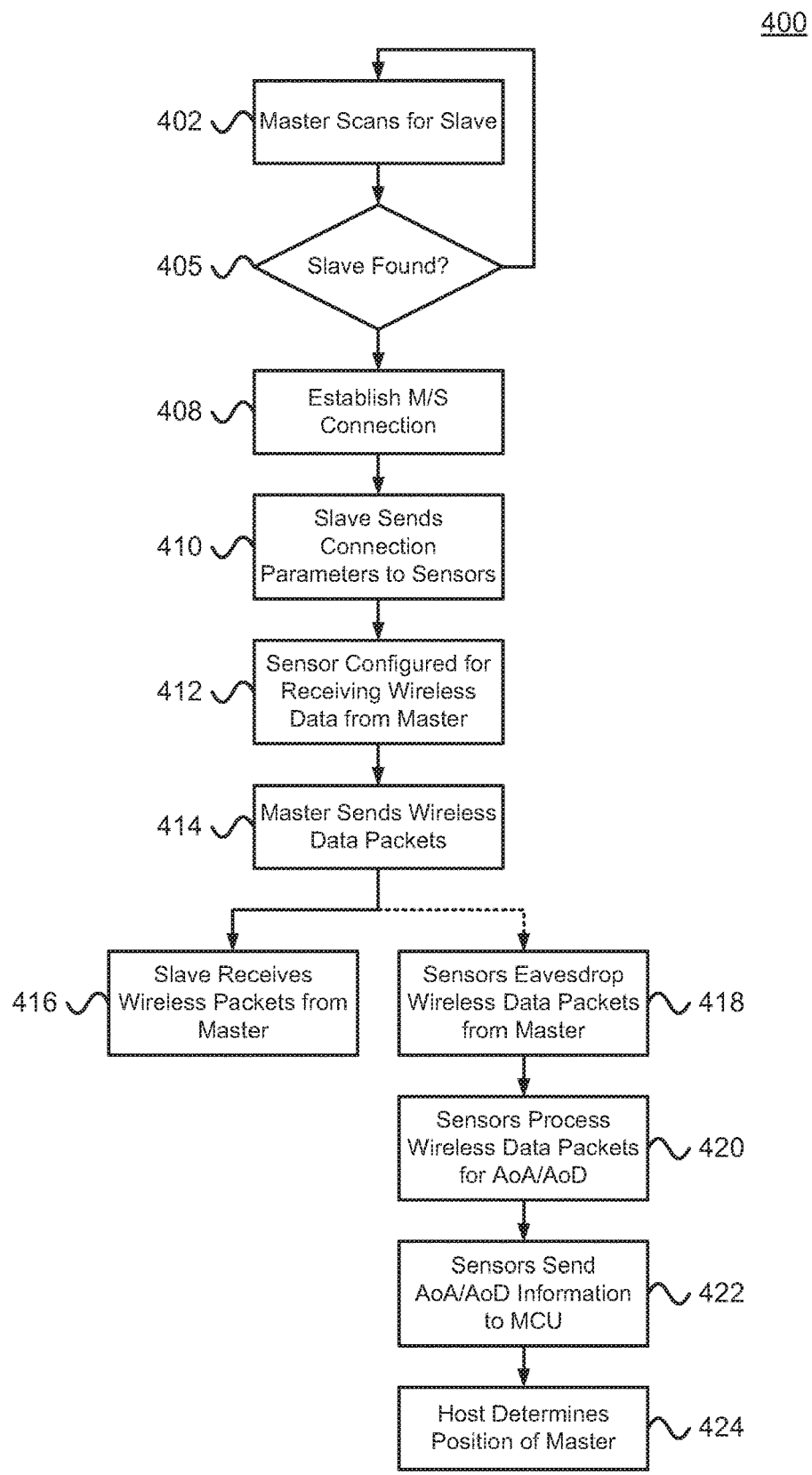
FIG. 4 illustrates a method for synchronizing sensors with wireless communication from a master device and for using wireless data packets for position calculation, according to one embodiment.

FIG. 4 illustrates a method 400 for calculating position of a master device relative to a system including a BLE hub and sensors as illustrated in FIGS. 2A and 2B. The master device (e.g., master device 210 of FIGS. 2A and 2B) scans for a slave device (e.g., BLE hub 220) in step 402. The slave device may have an advertisement rate at which the slave device broadcasts its presence for receipt by the master device. If the slave device is not found by the master device, as shown in step 405, the master continues to scan. In one embodiment, if a smartphone or a key fob does not see the BLE hub of a vehicle, it may continue to scan at some interval to maintain performance while optimizing its power consumption. Operating power saving techniques are discussed below. If a slave device is found by the master device (the BLE hub is found by the smartphone or key fob) in step 405, a master/slave connection is established in step 408. The slave device may then send the connection parameters (timing and protocol information) to the sensors in step 410. The slave device, such as BLE hub 220, may not be in direct connection with the sensors. In this embodiment, a connection is signaled to a controller, such as MCU 230. MCU may then request the connection parameters and broadcast them to the sensors over a bus, such as a CAN bus. The connection parameters are then received by an interface, such as a UART or a bridge device 240 and processed by the sensors. Other configurations may be implemented, including a direct connection between a controller for sensor 250 and the bus, a tertiary intermediate device between bridge 240 and sensor 250, or a communication interface circuit that is collocated with a processor of sensor 250.

Upon receipt of the connection parameters from the slave device (BLE hub 220), sensors are configured in step 412 so that they are synchronized with and able to receive wireless information from the master device as the master device is in operative communication with the slave device. The master device may then send wireless packets in step 414. Wireless packets may be CTE packets that are used in calculation of position related information. Wireless packets may also include non-CTE packets, such as control packets, which are received but not processed by the sensors for position calculation. In simultaneous steps, the slave device received wireless packets from the master device in step 416 and the sensors eavesdrop and receive the same wireless packets from the master in step 418. The sensors may process the received wireless packets for calculation of position related information in step 420 and send the that information as well as a confidence metric to the MCU in step 422. The MCU (host) may continue processing information received from the sensors to calculate an angle, distance, or position of the master device relative to the system in step 424.

Packets sent by the master device may not always be properly received by the BLE hub or the sensors. Bad packets may lead to failures of the position detection or PEPS system to operate or may produce results that are not accurate. Poor-quality data may yield errors in calculation or position-related information that impact the user experience. To ensure quality data and data processing, each packet may include a packet ID at the beginning of the packet. After the packet ID, the packet may include a firmware calculated cyclic redundancy check (CRC). The CRC may also be calculated in hardware, by programmable logic, or by known means of providing a processed value. The sensors may perform a CRC check on the received packet ID bytes to determine if the packet is corrupted. If the packet is identified as corrupted, the sensors may avoid processing the CTE, which may follow the CRC bytes in the packet. The CRC check and the subsequent avoidance of the processing of the CTE serves to avoid using corrupted data in calculating position, but it may also reduce on-chip power consumption by reducing the processing requirements. If the sensor is not required to process the CTE, it may enter a lower-power mode.

Figures 5A, 5B:
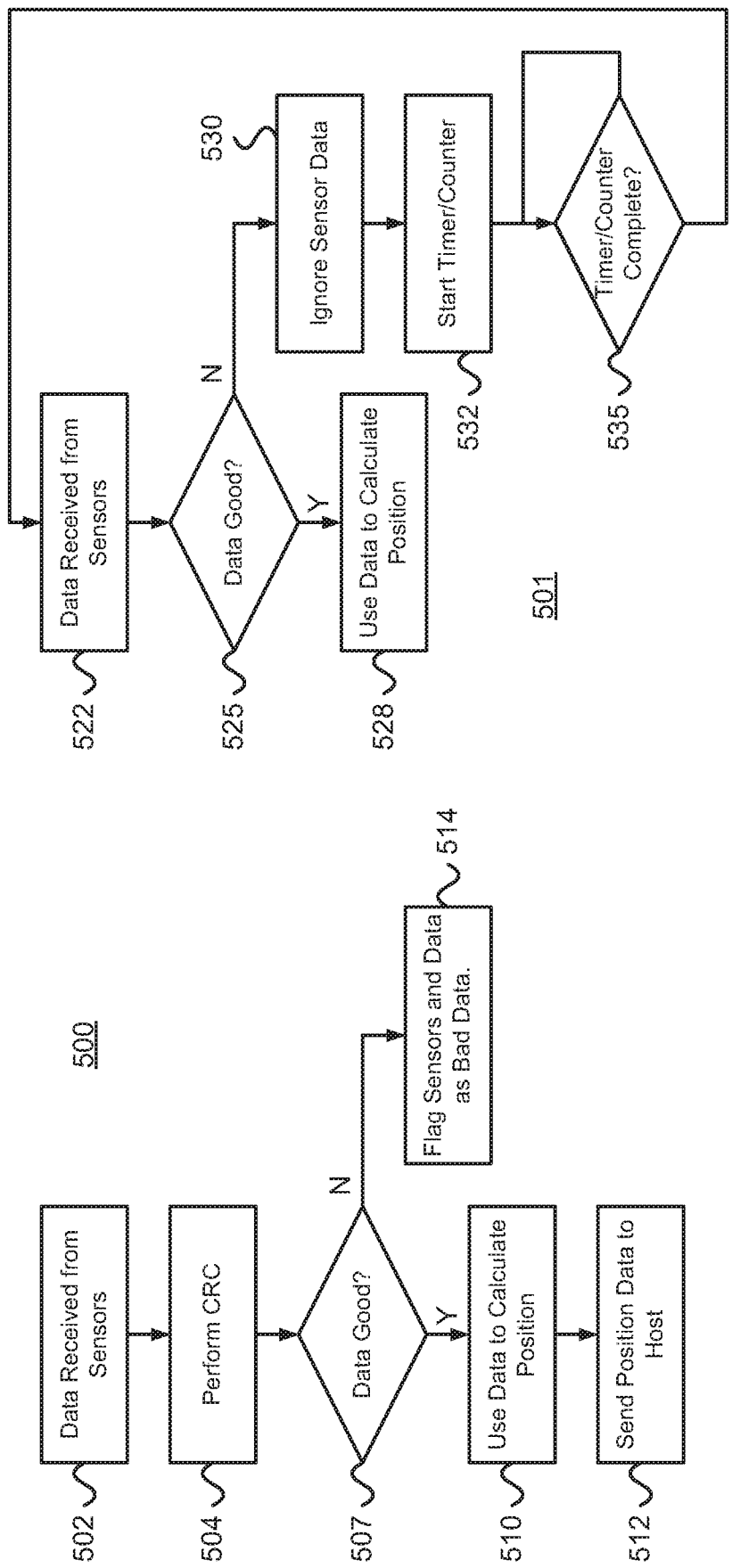
FIG. 5A illustrates a method for recognizing good and bad data from at least one sensor in a system using eavesdropping of wireless signals from a master device to a slave device, according to one embodiment.
FIG. 5B illustrate a method for ignoring data from potentially bad sensors, according to one embodiment.

FIG. 5A illustrates one embodiment of a method 500 for detection of bad packets by a sensor. First, a packet is received by the sensor from the master device in step 502. The sensor may perform a CRC on the packet in step 504 to check the quality of the packet. If the packet is good in step 507, the packet may be processed by using the CTE payload with an AoA processing method in step 510 and sent to the host (MCU) in step 512. If the packet is not good in step 507, either because the packet ID is wrong, the CRC fails, or the packet type is not a CTE packet, the packet may be flagged as bad and a new packet requested (for retransmission) in step 514. The MCU may then send a command to the slave device (BLE hub) for the master device to resend the wireless packet to be received by the sensors.

FIG. 5B illustrates another embodiment of a method 501 for detection of bad packets, this time by the MCU. Data may be received by the MCU from the sensors in step 522. That data may be processed to see if it is good in 525. If the position calculated is in-line with what is expected from the sensors, the data may be determined to be good. If it is, position-related information may be calculated in step 528. If the data is not good in step 525, data from the sensor may be ignored in step 530 and a timer started in step 532. Once the timer is complete in step 535, the MCU may allow the sensors to provide data again. The delay may be to reduce the bandwidth requirements and congestion on the bus between the sensors and the MCU from faulty data from sensors that are not operating properly or are not providing data of good enough quality for position calculation. If a sensor provides bad data enough times or for a long enough time period, a synchronization may be initiated to refresh the sensor and its ability to eavesdrop wireless information from the master device and provide data to the MCU for position calculation.

Sensors may be configured to enable antenna switching and phase/magnitude processing on every packet received from the master device. Packets received by the sensors may include the CTE packets that are used for position calculation. But the packets may also be control packet or other packets used for communication with the BLE hub and MCU. Sensors may not be equipped to differentiate between packet types and may process non-CTE packets to find the phase and magnitude for position calculation. Since non-CTE packets do not have the requisite information for sensors to process and send to the BLE hub, packets received and processed that do not have CTE data may produce incorrect position information.

The master device may send packet ID and CRC data only on CTE packets. This mechanism allows the sensors to perform a CRC, producing a failure. The CRC failure may cause the sensor to treat a non-CTE packet as a corrupted or bad packet, removing the non-CTE packet from position calculation. If the packet is identified as a non-CTE packet, but is not a bad packet, no retransmission may be requested.

Once the MCU receives timing and protocol information and connection parameters from the BLE hub, that information may be communicated to the sensors as quickly as possible. In one embodiment, this communication is over the CAN bus. Reducing the delay in transmitting timing and protocol information to the sensors reduces latency in calculating and tracking the position of the master device. The sensors, having received the timing and protocol information from the BLE hub via the MCU, may provide a response indicative of a proper synchronization with the master device wireless communication that is received by the MCU. The MCU may process the individual responses from the sensors to identify which sensors are properly synchronized with the connection between the master device and the BLE hub.

A failed synchronization may be caused by a timing mismatch which may cause an inability for sensors to receive the signal from the master device. If there is a timing mismatch, all of the sensors will fail. This may indicate that the connection parameters provided by the BLE hub are not operative or correct. For a timing mismatch, the MCU may re-request timing and protocol information from the BLE hub and rebroadcast to the sensors (such as over a CAN bus).

Timing failures may occur if latency in the system is not deterministic. This may be caused if the bus used to distribute the timing and protocol information from the MCU to the sensors is congested. In one embodiment, a CAN bus may be used for all or most of the electronics in an automotive application. The level of traffic over the CAN bus may create latency in communication that cannot be easily prescribed. To account for this, one embodiment of the present invention may involve synchronizing all devices in the PEPS system (or similar system using AoA or AoD for distance or position estimation) to the same Bluetooth (BT) master clock. In this embodiment, the MCU may send timing information based on when the next BT event will happen, rather than a time until the next BT event happens. In another embodiment, a timer may be used to determine a delay in the communication over the bus and the timing parameters sent to the sensors from the MCU may be adjusted based on the value of the timer to account for the offset.

If there is not a timing mismatch, a signal failure may occur when some but not all sensors are unsuccessful based on their position relative to the master device and surrounding elements. If a signal failure is detected, the MCU may use logic to determine if there is enough data received from the sensors to calculate and track the position of the master device. Data used may include the number of sensors, the position of the sensors that are transmitting good data relative to the system, the master, or each other, the confidence metric associated with each sensors data, if there is enough data from sensors without a signal failure, position-related information may be calculated and tracked. If there is not enough information, either because not enough sensors can receive the signal or because of a series of bad packets, the MCU may request synchronization data from the BLE hub a second time and distribute it to the sensors in a second attempt at synchronization.

Sensors that are already synchronized to the communication between the master device and the BLE hub need not receive and/or process synchronization information from the MCU. This information can therefore be ignored, saving power by the sensors and reducing traffic on the buss as sensors are not attempting to transmit confirmation.

Figure 6:
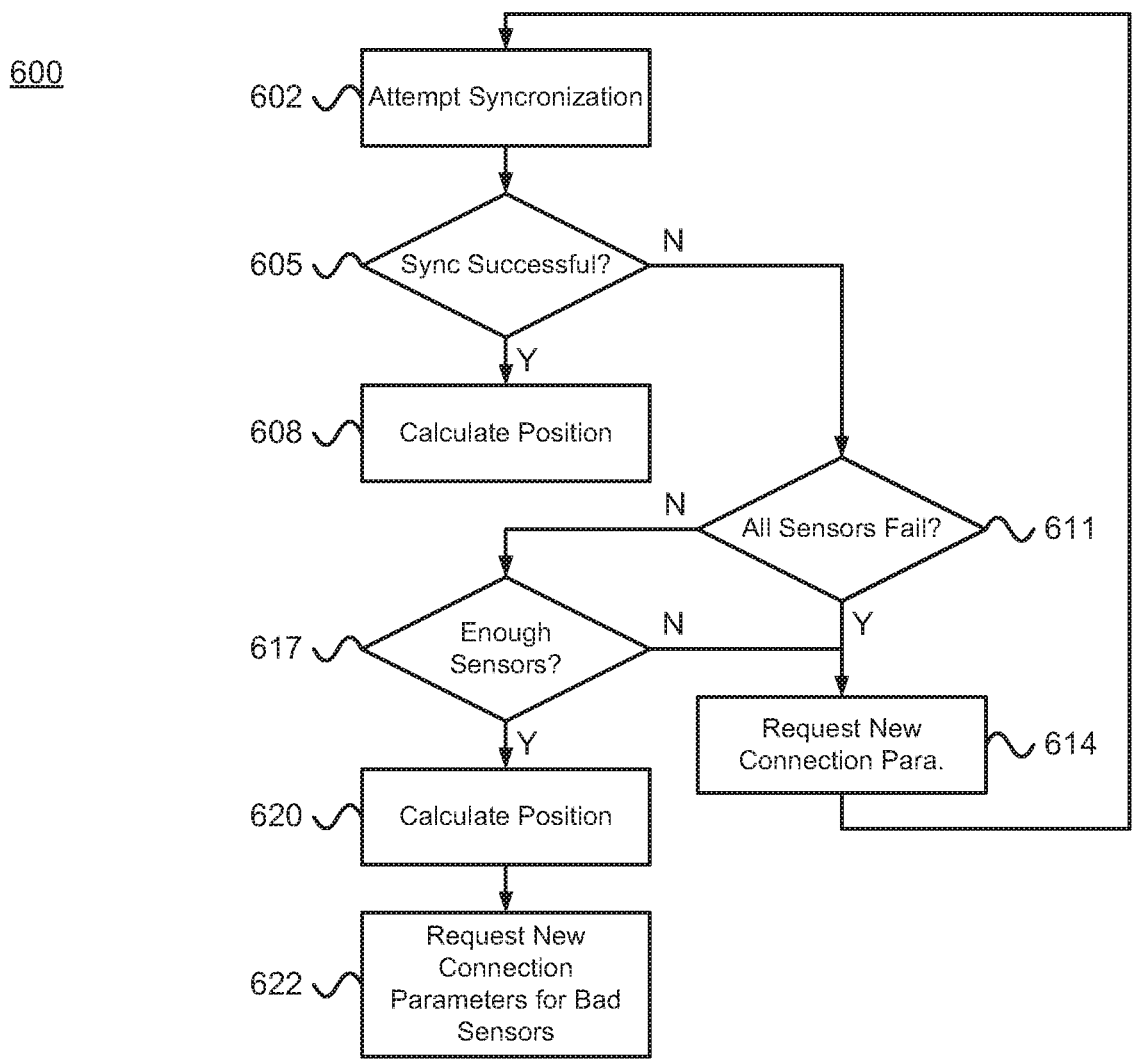
FIG. 6 illustrates a method for recognizing timing and signal failures by sensors in a system, according to one embodiment.

FIG. 6 illustrates a method 600 of recognizing failed sensors including sensors that failed due to timing (all sensors fail) and signal (not all sensors fail). After a synchronization attempt in step 602, wherein timing and protocol is provided to sensors by a host device (i.e., MCU) from a slave device (i.e., BLE hub) in operative communication with a master device the sensors may attempt to receive CTE packets from the master device by eavesdropping. If synchronization is successful (all sensors received good packets) in step 605, data is provided to the MCU from the sensors and position is calculated in step 608. If synchronization was not successful in step 605 and there is at least one sensor that is not synchronized and is not receiving wireless packets from the master device, method 600 determines if all of the sensors failed, which is indicative of a timing fail, in step 611. If all the sensors failed, new connection parameters may be requested for the sensors from the BLE hub through the MCU in step 614 and synchronization may be re-attempted.

If some sensors failed, but not all, the MCU may determine if there are enough sensors correctly receiving good wireless data from the master device to determine position in step 617. If there are enough sensors providing good information to the MCU, position may be calculated in step 620 and new connection information may be requested from the BLE hub for failed sensors in step 622. If there are not enough sensors providing good data to the MCU in step 617, new connection parameters may be requested for sensors that are not synchronized, do not provide good data, or for which confidence is too low. In some embodiments, angle of arrival, distance, or position may not be calculated until there are enough connected (synchronized) sensors providing good data with good confidence.

In one embodiment, the MCU may periodically initiate a synchronization between the sensors and the master device as the master device moves relative to the sensors. As with a retry on synchronization due to poor data from the sensors, sensors that are already synchronized with communication from the master device to the BLE hub may ignore the periodic synchronization.

When communication between sensors and the MCU is accomplished over a bus (such as a CAN bus) on which other devices are communicating, the bus may become congested. The system including the MCU and sensors may not be able to control the communication of other devices over the bus. In one embodiment, the MCU may transmit a command to the sensors to control how frequently each sensor sends packet reports back to the MCU over the bus. In various embodiments, the sensors that are required to report to the MCU may be scheduled by the MCU based on the numbers of sensors that are connected to the bus and have a good, synchronized connection with the master device. The MCU may also schedule sensors to communicate packet reports based on their relative position to the master device and a measured RSSI on the transmissions from the master device. The MCU may also schedule sensors to communicate packet reports based on their packet loss rate. Sensors with higher rates of packet loss may be required to send packet reports at lower frequency than sensors with low rates of packet loss. Similarly, sensors that are either closer to the master device or have lower calculated RSSI values may be given priority and be requested to send data and packet reports at greater frequency than sensors that are farther away from the master device or for which there is higher signal interference.

Sensors that are missing packets may be ignored by the MCU, but the MCU may also determine that an increased rate of resynchronization attempts (as shown in step 602 of FIG. 6) is required if there are insufficient sensors that are synchronized to the master device and are providing good packet reports with high enough confidence. If there are sufficient sensors with good packet reports with high enough confidence to determine an accurate position of the master device, the MCU may issue a command to sensors with missing packets or higher rates of packet loss to reduce the interval at which these sensors send packet reports to the MCU. This may reduce system power consumption by reducing the rate at which sensors process packet information, improve position calculation by reducing the impact of potentially faulty or sub-optimal packets in the processing of packet reports, and reduce bus congestion by reducing communication with and by sensors that have been deprioritized.

If a sensor misses too many packets, the sensor may issue a connection timeout over the bus to the MCU. The timeout value may be adjusted to optimize how quickly a faulty or "dead" sensor is identified. Once a timeout occurs and is communicated to the MCU, the MCU may initiate a resynchronization attempt (as shown in step 602 of FIG. 6) a setup with sensors that are disconnected. If sensors repeatedly disconnect, the MCU may determine that an increased setup rate is required so the sensors are synchronized with the master device automatically and before a timeout occurs. This may improve calculation or position-related information by ensuring that as many sensors are providing good packet reports to the MCU as possible without waiting for additional processing.

Figure 7:
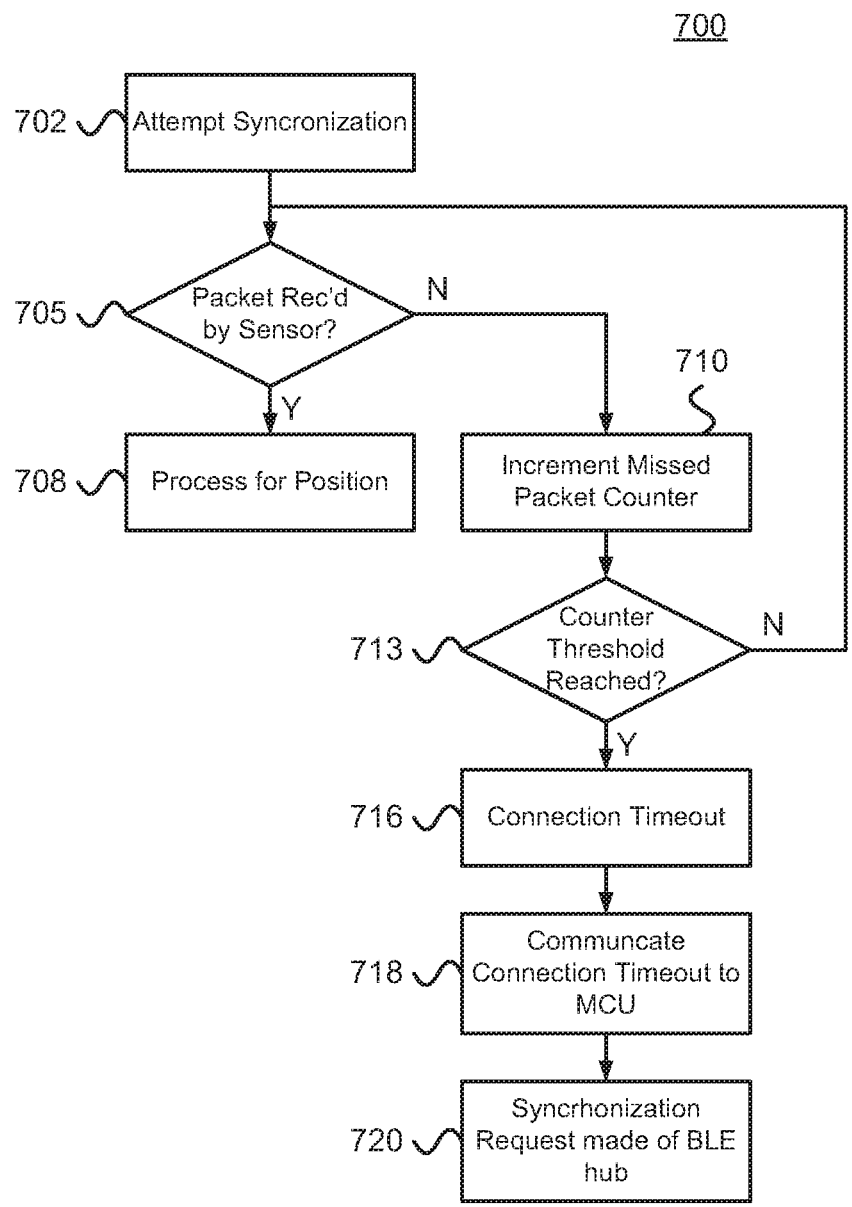
FIG. 7 illustrates a method of recognizing and correcting for missed packets in a wireless system, according to one embodiment.

FIG. 7 illustrates a method 700 for recognizing and correcting for missed packets by a sensor. Synchronization is first attempted in step 702. Synchronization may include receiving communication parameters at the sensor(s) from the BLE hub by way of the MCU. After the sensor is configured with the received communication parameters, a wireless transmission from the master device may or may not be received by the sensor. If the packet of the wireless transmission is received by the sensor in step 705, a synchronized eavesdrop is established and the packet may be processed for angle of arrival, distance, or position calculation. If the sensor is successful synchronized with the master device's communication with the BLE hub, but the packet is not received (is missed) in step 705, a missed packet counter may be incremented in step 710. The value of the missed packet counter may be compared to a threshold number of missed packets in step 713. The missed packet threshold may be set such that an acceptable number of packets may be missed before a connection timeout is detected and synchronization is reinitiated. If the missed packet threshold is not reached by the missed packet counter, method 700 returns to step 705. If the missed packet threshold is reached by the missed packet counter, a connection timeout may be determined in step 716. The connection timeout may be communicated to the MCU in step 718 and the MCU may reinitiate a synchronization in step 720.

Several scenarios may occur that may impact performance and power consumption of system using eavesdropping of wireless signals for AoA calculation of position or position-related information. These scenarios, and tools for improving performance and power consumption are discussed below.

If the master device is not able to connect with the BLE hub, the master device may execute various power-saving operations. A master device may not be able to connect with the BLE hub for a variety of reasons. The BLE hub may be well out of range; the master device may be a phone or a key fob that is with the user while the BLE hub is implemented in a car that is parked in a garage or otherwise far away from the user. The BLE hub may lose power. In this instance, if the BLE hub is implemented in a car, the battery level of the car may be too low to power the BLE hub. The BLE hub may be disconnected by power control circuitry in the car when the battery level is too low and only critical functions are permitted. Position information of the master device may not be critical in all applications and its use may be deactivated by the power control circuity. In still other embodiments, the BLE hub may be faulty. In all of these embodiments, the master device may shut down or throttle back its attempts to communicate with the BLE hub to conserve its own power.

If the master device is a key fob, scanning for the BLE hub may be deactivated until receipt of a trigger event (such as a button press on the key fob) or a timeout based on a low power clock. If the master device is another wireless device, such as a mobile phone, the scanning interval may need to be long enough to capture signals from the BLE hub at a low advertisement interval, but short enough to reduce the negative impacts on battery life. In one embodiment, an application on the phone may be used to initiate scanning. If the master device is a mobile device, such as a smart phone, a user interrupt my trigger scanning. The user interrupt may be based on interaction with an app, movement of the device (measured with an accelerometer), GPS location, of other methods of determining that the device is active and that the user may want PEPS enabled.

The BLE hub may include or be coupled to a battery voltage monitor. In response to information or signals from the battery voltage monitor, the BLE hub may increase or decrease the advertising rate. Certain battery voltage levels may correspond to certain advertisement rates.

In one embodiment, the sensors may be in an idle or low-power state until the MCU attempts to set the eavesdropping parameters (timing and protocol information) over the bus. The UART for each sensor may implement an interrupt. In still another embodiment, a general purpose input/output (GPIO) or another input for waking up the sensors may be implemented. The goal of this embodiment is to reduce the power consumption of the system when no master device is in operative communication with the BLE hub.

In a similar embodiment, the sensors may be put into an idle or low-power mode while the system including the master device, the BLE hub, the MCU, and the sensors is moving. For example, if a car implementing this described system is moving or if the user (and the master device) is inside the car, calculation or position-related information of the master device to a PEPS system is no long needed. While power requirements are not a primary concern when the car is moving and the engine is running, putting the sensors into an idle mode may reduce congestion on the bus. The sensor hub may also be put into an idle mode while the car is on. In another embodiment, when the master device is in the car, sensors that are located for exterior detection of the master device may be deactivated. When the master device is outside the vehicle, sensors configured for detection of the master device inside the car may e deactivated.

Once the car is stopped and the vehicle is turned off, the BLE hub may return to an active advertisement mode to enable passive start and, if the user and the master device are no longer in the vehicle, passive entry.

In another use case, the master device may be within range of the BLE hub for an extended period. RSSI may be used as an indicator of whether a connection needs to be maintained. If there is very high RSSI and it is more-or-less static, this may indicate that the master device is far away and not getting any closer. This may indicate to the MCU that the connection between the BLE hub and the master device is not necessary. The BLE hub can therefore reduce its advertisement rate substantially. If the master device is in close proximity to the BLE hub (and the sensors) for a long period of time, the BLE hub may implement a connection interval update to reduce the connection interval and to reduce the information sent from the master device to the BLE hub (and the sensors). When the connection interval is changed, the sensors will need to recognize the packet as a control packet and not a CTE packet for use in position calculation and process it accordingly.

As used herein, the term "coupled to" means connected directly, or connected indirectly through one or more intervening components over PCB tracks/pads, switches, buses, hubs, trace lines, and/or programmable interconnects, as the case may be. Any of the signals provided through various PCB tracks/pads, switches, hubs, traces, and programmable interconnects may be time multiplexed with other signals and provided over one or more common or dedicated buses and/or signal traces. Each of the buses may alternatively include one or more single signal traces, and one or more signal traces may alternatively perform the function of a bus.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative sense rather than a restrictive sense.

What is claimed is:

1. A sensor device comprising:
   a processor coupled to a plurality of antennas, the processor for receiving wireless signals through the plurality of antennas and determining phase and magnitude of the received wireless signals at the plurality of antennas; and
   an input/output (I/O) for receiving wireless communication protocol from a microcontroller unit (MCU), the wireless communication protocol corresponding to a master device in operative wireless communication with a slave device,
   wherein the received wireless signals are received by the sensor device from the master device while the master device is in cooperative wireless communication with the slave device, and
   wherein the phase and magnitude of the received wireless signals corresponds to a position of the master device relative to the sensor device.

2. The sensor device of claim 1, wherein the I/O is coupled to a bus for receiving the wireless communication protocol from the microcontroller unit.

3. The sensor device of claim 2, wherein the bus is a controller area network (CAN) bus.

4. The sensor device of claim 1, wherein the I/O is for sensing phase and magnitude information of the wireless signals to the MCU.

5. The sensor device of claim 1, wherein each of the plurality of antennas is configured to receive the wireless signals from the master device and wherein a phase and magnitude difference between the received signals at each of the antenna corresponds to a position of the master device relative to each antenna.

6. The sensor device of claim 1, wherein the received wireless signals includes data packets.

7. The sensor device of claim 6, wherein the processor device is for executing a cyclic redundancy check (CRC) on the data packets.

8. The sensor device of claim 1, wherein the wireless signals are receiving as part of a passive entry, passive start (PEPS) automotive application.

9. The sensor device of claim 1, wherein the wireless communication protocol is Bluetooth Low Energy (BLE).

10. A system comprising:
    a communication hub device;
    a bus;
    a microcontroller unit (MCU) coupled to the communication hub device and the bus; and
    a plurality of sensors coupled to the bus, wherein:
    the communication hub device is for establishing a connection with a master device over a wireless communication protocol,
    the plurality of sensors are for receiving a plurality of eavesdropped signals from the master device in operative communication with the communication hub device,
    the MCU is for receiving wireless communication protocol information from the communication hub device and sending the wireless communication protocol information to the plurality of sensors over the bus,
    and the MCU is for receiving phase and magnitude information from each of the plurality of sensors and calculating a relative position of the master device to the system based on the received phase and magnitude information.

11. The system of claim 10, wherein the bus is a controller area network (CAN) bus.

12. The system of claim 10, wherein sensors are synchronized with the connection between the master device and the communication hub device.

13. The system of claim 12, wherein, if a sensor fails to synchronize with the connection between the master device and the communication hub device, the MCU is for requesting communication protocol information from the communication hub device and for sending the received communication protocol information to the failed sensor to re-attempt synchronization.

14. The system of claim 10, wherein the MCU is for calculating position of the master device relative to the system based on received phase and magnitude from a subset of the plurality of sensors.

15. The system of claim 14, wherein the subset of the plurality of sensors includes sensors that received high-quality wireless signals from the master device.

16. The system of claim 14, wherein the subset of the plurality of sensors includes all sensors that received wireless signals from the master device.

17. The system of claim 10, wherein the master device is a key fob.

18. The system of claim 10, wherein the master device is a smartphone.

19. The system of claim 10, wherein the plurality of sensors, the MCU, and the communication hub device are part of a passive entry, passive start (PEPS) automotive application.

20. A method for determining position of a master device relative to a slave device, the method comprising:
    requesting, by the slave device, to establish wireless communication with the master device;
    receiving, by the slave device, an acknowledgement from the master device;
    establishing, by the slave device, a wireless communication between the slave device and the master device;
    receiving, by a plurality of sensors, wireless communication protocol from the slave device, the wireless communication protocol corresponding to the wireless communication between the slave device and the master device;

receiving, by the plurality of sensors, wireless data packets from the master device;

calculating, by the plurality of sensors, phase and magnitude of the wireless communication;

calculating, by a microcontroller unit (MCU) coupled to the plurality of sensors, a relative position of the master device to the slave device from the phase and magnitude of the wireless communication.

21. The method of claim 20, wherein receiving the wireless communication protocol from the slave device is by way of the MCU and a bus coupled between the MCU and each of the plurality of sensors.

22. The method of claim 20 further comprising:
detecting at least one sensor of the plurality of sensors as failing to synchronize with the wireless communication between the slave device and master device; and
resending, by the MCU, wireless communication to the unsynchronized sensors.

23. The method of claim 20, wherein the wireless data packets include a CTE packet.

24. The sensor device of claim 20, wherein the method is performed as part of a passive entry, passive start (PEPS) automotive application.

* * * * *